United States Patent
Zupanick

(12) 
(10) Patent No.: US 6,725,922 B2
(45) Date of Patent: Apr. 27, 2004

(54) RAMPING WELL BORES

(75) Inventor: Joseph A. Zupanick, Pineville, WV (US)

(73) Assignee: CDX Gas, LLC, Dallas, TX (US)

( * ) Notice: Subject to any disclaimer, the term of this patent is extended or adjusted under 35 U.S.C. 154(b) by 0 days.

(21) Appl. No.: 10/194,367

(22) Filed: Jul. 12, 2002

(65) Prior Publication Data

US 2004/0007352 A1 Jan. 15, 2004

(51) Int. Cl.⁷ .............................................. E21B 43/24
(52) U.S. Cl. ........................... 166/245; 166/50; 166/52; 166/313; 175/61
(58) Field of Search .................... 175/61, 62; 166/245, 166/50, 313, 52

(56) References Cited

U.S. PATENT DOCUMENTS

| | | |
|---|---|---|
| 54,144 A | 4/1866 | Hamar |
| 274,740 A | 3/1883 | Douglass |
| 526,708 A | 10/1894 | Horton |
| 639,036 A | 12/1899 | Heald |
| 1,189,560 A | 7/1916 | Gondos |
| 1,285,347 A | 11/1918 | Otto |
| 1,467,480 A | 9/1923 | Hogue |
| 1,485,615 A | 3/1924 | Jones |
| 1,674,392 A | 6/1928 | Flansburg |
| 1,777,961 A | 10/1930 | Capeliuschnicoff |
| 2,018,285 A | 10/1935 | Schweitzer et al. ........... 166/21 |
| 2,069,482 A | 2/1937 | Seay ........................... 255/76 |
| 2,150,228 A | 3/1939 | Lamb ......................... 166/10 |
| 2,169,718 A | 8/1939 | Boll et al. ..................... 255/24 |
| 2,335,085 A | 11/1943 | Roberts ....................... 251/197 |
| 2,450,223 A | 9/1948 | Barbour ....................... 255/76 |
| 2,490,350 A | 12/1949 | Grable ........................... 166/4 |
| 2,679,903 A | 6/1954 | McGowen, Jr. et al. ........ 166/1 |
| 2,726,063 A | 12/1955 | Ragland et al. .............. 255/1.8 |

(List continued on next page.)

FOREIGN PATENT DOCUMENTS

| | | | |
|---|---|---|---|
| EP | 0 875 661 A1 | 11/1998 | ........... E21B/43/30 |
| EP | 0 952 300 A1 | 10/1999 | ............. E21B/7/12 |
| FR | 964503 | 4/1944 | ........................ 8/1 |
| GB | 750108 | 6/1975 | ........... E21C/45/00 |
| GB | 1448078 A1 | 3/1987 | ............. E21F/5/00 |
| GB | 1770570 A1 | 3/1990 | ............. E21F/7/00 |
| GB | 2 297 988 | 8/1996 | ............. E21B/7/08 |
| GB | 2 347 157 A | 8/2000 | ........... E21B/43/00 |
| WO | 94/21889 | 9/1994 | ........... E21B/43/24 |
| WO | WO 99/60248 | 11/1999 | ........... E21B/43/30 |
| WO | WO 00/31376 | * 6/2000 | |
| WO | 00/31376 | 6/2000 | ........... E21C/41/00 |
| WO | WO 00/79099 | 12/2000 | ........... E21B/43/25 |
| WO | WO 02/18738 | 3/2002 | ............. E21B/7/04 |
| WO | WO 02/059455 | 8/2002 | ........... E21B/43/00 |

OTHER PUBLICATIONS

McCray and Cole, "Oil Well Drilling and Technology," University of Oklahoma Press, pp. 315–319, 1959.

(List continued on next page.)

*Primary Examiner*—John Kreck
(74) *Attorney, Agent, or Firm*—Baker Botts L.L.P.

(57) ABSTRACT

In accordance with one embodiment of the present invention, a subterranean drainage pattern for accessing a subterranean zone includes a main well bore extending from a surface well bore, located at a first end of the area, to a second end of the area. A first plurality of lateral well bores extend in spaced apart relation to each other from the main well bore to the periphery of the area on a first side portion of the main well bore. A second plurality of lateral well bores extend in spaced apart relation to each other from the main well bore to a periphery of the area on a second, opposite side portion of the main well bore. A first plurality of ramping well bores extend in spaced apart relation to each other from the main well bore toward a boundary of the subterranean zone.

32 Claims, 8 Drawing Sheets

U.S. PATENT DOCUMENTS

| | | | | |
|---|---|---|---|---|
| 2,726,847 | A | 12/1955 | McCune et al. | 255/1.6 |
| 2,783,018 | A | 2/1957 | Lytle | 251/25 |
| 2,847,189 | A | 8/1958 | Shook | 255/76 |
| 2,911,008 | A | 11/1959 | Du Bois | 137/625.31 |
| 2,980,142 | A | 4/1961 | Turak | 137/637.3 |
| 3,347,595 | A | 10/1967 | Dahms et al. | 299/4 |
| 3,443,648 | A | 5/1969 | Howard | 175/103 |
| 3,473,571 | A | 10/1969 | Dugay | 137/625.4 |
| 3,503,377 | A | 3/1970 | Beatenbough et al. | 123/117 |
| 3,528,516 | A | 9/1970 | Brown | 175/267 |
| 3,530,675 | A | 9/1970 | Turzillo | 61/35 |
| 3,684,041 | A | 8/1972 | Kammerer, Jr. et al. | 175/267 |
| 3,692,041 | A | 9/1972 | Bondi | 137/238 |
| 3,757,876 | A | 9/1973 | Pereau | 175/267 |
| 3,757,877 | A | 9/1973 | Leathers | 175/269 |
| 3,800,830 | A | 4/1974 | Etter | 137/625.41 |
| 3,809,519 | A | 5/1974 | Garner | 425/245 |
| 3,825,081 | A | 7/1974 | McMahon | 175/73 |
| 3,828,867 | A | 8/1974 | Elwood | 175/45 |
| 3,874,413 | A | 4/1975 | Valdez | 137/625.47 |
| 3,887,008 | A | 6/1975 | Canfield | 166/267 |
| 3,902,322 | A | 9/1975 | Watanabe | 61/35 |
| 3,907,045 | A | 9/1975 | Dahl et al. | 175/45 |
| 3,934,649 | A | 1/1976 | Pasini, III et al. | 166/254 |
| 3,957,082 | A | 5/1976 | Fuson et al. | 137/625.41 |
| 3,961,824 | A | 6/1976 | Van Eek et al. | 299/17 |
| 4,011,890 | A | 3/1977 | Andersson | 137/625.4 |
| 4,022,279 | A | 5/1977 | Driver | 166/271 |
| 4,037,658 | A | 7/1977 | Anderson | 166/272 |
| 4,073,351 | A | 2/1978 | Baum | 175/14 |
| 4,089,374 | A | 5/1978 | Terry | 166/259 |
| 4,116,012 | A | 9/1978 | Abe et al. | 405/238 |
| 4,156,437 | A | 5/1979 | Chivens et al. | 137/554 |
| 4,169,510 | A | 10/1979 | Meigs | 175/65 |
| 4,189,184 | A | 2/1980 | Green | 299/8 |
| 4,220,203 | A | 9/1980 | Steeman | 166/271 |
| 4,221,433 | A | 9/1980 | Jacoby | 299/4 |
| 4,257,650 | A | 3/1981 | Allen | 299/2 |
| 4,278,137 | A | 7/1981 | Van Eek | 175/267 |
| 4,283,088 | A | 8/1981 | Tabakov et al. | 299/2 |
| 4,296,785 | A | 10/1981 | Vitello et al. | 141/105 |
| 4,299,295 | A | 11/1981 | Gossard | 175/45 |
| 4,305,464 | A | 12/1981 | Masszi | 166/370 |
| 4,312,377 | A | 1/1982 | Knecht | 137/625.19 |
| 4,317,492 | A | 3/1982 | Summers et al. | 175/79 |
| 4,328,577 | A | 5/1982 | Abbott et al. | 370/84 |
| 4,366,988 | A | 1/1983 | Bodine | 299/14 |
| 4,372,398 | A | 2/1983 | Kuckes | 175/45 |
| 4,386,665 | A | 6/1983 | Dellinger | 175/61 |
| 4,390,067 | A | 6/1983 | Willman | 166/245 |
| 4,396,076 | A | 8/1983 | Inoue | 175/265 |
| 4,397,360 | A | 8/1983 | Schmidt | 175/61 |
| 4,401,171 | A | 8/1983 | Fuchs | 175/267 |
| 4,407,376 | A | 10/1983 | Inoue | 175/267 |
| 4,437,706 | A | 3/1984 | Johnson | 299/7 |
| 4,442,896 | A | 4/1984 | Reale et al. | 166/278 |
| 4,494,616 | A | 1/1985 | McKee | 175/67 |
| 4,512,422 | A | 4/1985 | Knisley | 175/99 |
| 4,519,463 | A | * 5/1985 | Schuh | 166/50 |
| 4,527,639 | A | 7/1985 | Dickinson, III et al. | 175/61 |
| 4,532,986 | A | 8/1985 | Mims et al. | 166/50 |
| 4,544,037 | A | 10/1985 | Terry | 166/369 |
| 4,558,744 | A | 12/1985 | Gibb | 166/335 |
| 4,565,252 | A | 1/1986 | Campbell et al. | 175/269 |
| 4,573,541 | A | 3/1986 | Josse et al. | 175/78 |
| 4,599,172 | A | 7/1986 | Gardes | 210/314 |
| 4,600,061 | A | 7/1986 | Richards | 175/62 |
| 4,605,076 | A | 8/1986 | Goodhart | 175/61 |
| 4,611,855 | A | 9/1986 | Richards | 299/2 |
| 4,618,009 | A | 10/1986 | Carter et al. | 175/267 |
| 4,638,949 | A | 1/1987 | Mancel | 239/307 |
| 4,646,836 | A | * 3/1987 | Goodhart | 166/50 |
| 4,674,579 | A | 6/1987 | Geller et al. | 175/45 |
| 4,702,314 | A | 10/1987 | Huang et al. | 166/245 |
| 4,705,431 | A | 11/1987 | Gadelle et al. | 405/267 |
| 4,715,440 | A | 12/1987 | Boxell et al. | 166/100 |
| 4,754,819 | A | 7/1988 | Dellinger | 175/61 |
| 4,756,367 | A | 7/1988 | Puri et al. | 166/263 |
| 4,763,734 | A | 8/1988 | Dickinson et al. | 175/61 |
| 4,773,488 | A | 9/1988 | Bell et al. | 175/61 |
| 4,830,105 | A | 5/1989 | Petermann | 166/241 |
| 4,836,611 | A | 6/1989 | El-Saie | 299/7 |
| 4,842,081 | A | 6/1989 | Parant | 175/23 |
| 4,844,182 | A | 7/1989 | Tolle | 175/215 |
| 4,852,666 | A | * 8/1989 | Brunet et al. | 175/61 |
| 4,883,122 | A | 11/1989 | Puri et al. | 166/248 |
| 4,978,172 | A | 12/1990 | Schwoebel et al. | 299/12 |
| 5,016,710 | A | 5/1991 | Renard et al. | 166/245 |
| 5,035,605 | A | 7/1991 | Dinerman et al. | 481/18 |
| 5,036,921 | A | 8/1991 | Pittard et al. | 166/298 |
| 5,074,360 | A | 12/1991 | Guinn | 166/281 |
| 5,074,365 | A | 12/1991 | Kuckes | 175/40 |
| 5,074,366 | A | 12/1991 | Karlsson et al. | 175/76 |
| 5,082,054 | A | 1/1992 | Kiamanesh | 166/248 |
| 5,111,893 | A | 5/1992 | Kvello-Aune | 175/258 |
| 5,135,058 | A | 8/1992 | Millgard et al. | 175/71 |
| 5,148,875 | A | 9/1992 | Karlsson et al. | 175/62 |
| 5,165,491 | A | 11/1992 | Wilson | 175/62 |
| 5,168,942 | A | 12/1992 | Wydrinski | 175/50 |
| 5,174,374 | A | 12/1992 | Hailey | 166/55.8 |
| 5,193,620 | A | 3/1993 | Braddick | 166/382 |
| 5,194,859 | A | 3/1993 | Warren | 340/853.4 |
| 5,197,553 | A | 3/1993 | Leturno | 175/57 |
| 5,197,783 | A | 3/1993 | Theimer et al. | 299/17 |
| 5,199,496 | A | 4/1993 | Redus et al. | 166/366 |
| 5,201,817 | A | 4/1993 | Hailey | 175/269 |
| 5,217,076 | A | 6/1993 | Masek | 166/303 |
| 5,226,495 | A | 7/1993 | Jennings, Jr. | 166/278 |
| 5,240,350 | A | 8/1993 | Yamaguchi et al. | 405/143 |
| 5,242,017 | A | 9/1993 | Hailey | 166/55.8 |
| 5,242,025 | A | 9/1993 | Neill et al. | 175/26 |
| 5,246,273 | A | 9/1993 | Rosar | 299/4 |
| 5,255,741 | A | 10/1993 | Alexander | 166/278 |
| 5,271,472 | A | 12/1993 | Leturno | 175/107 |
| 5,301,760 | A | 4/1994 | Graham | 175/61 |
| 5,363,927 | A | 11/1994 | Frank | 175/67 |
| 5,385,205 | A | 1/1995 | Hailey | 166/55.8 |
| 5,394,950 | A | 3/1995 | Gardes | 175/45 |
| 5,402,851 | A | 4/1995 | Baiton | 166/369 |
| 5,411,082 | A | 5/1995 | Kennedy | 166/181 |
| 5,411,085 | A | 5/1995 | Moore et al. | 166/242 |
| 5,411,104 | A | 5/1995 | Stanley | 175/65 |
| 5,411,105 | A | 5/1995 | Gray | 175/69 |
| 5,431,220 | A | 7/1995 | Lennon et al. | 166/55.7 |
| 5,435,400 | A | 7/1995 | Smith | 175/61 |
| 5,447,416 | A | 9/1995 | Wittrisch | 417/442 |
| 5,450,902 | A | 9/1995 | Matthews | 166/268 |
| 5,454,419 | A | 10/1995 | Vloedman | 166/277 |
| 5,458,209 | A | 10/1995 | Hayes et al. | 175/61 |
| 5,462,116 | A | 10/1995 | Carroll | 166/249 |
| 5,462,120 | A | 10/1995 | Gondouin | 166/380 |
| 5,469,155 | A | 11/1995 | Archambeault et al. | 340/853.4 |
| 5,477,923 | A | 12/1995 | Jordan, Jr. et al. | 66/313 |
| 5,485,089 | A | 1/1996 | Kuckes | 324/346 |
| 5,494,121 | A | 2/1996 | Nackerud | 175/263 |
| 5,499,687 | A | 3/1996 | Lee | 175/317 |
| 5,501,273 | A | 3/1996 | Puri | 166/252.5 |
| 5,501,279 | A | 3/1996 | Garg et al. | 166/372 |
| 5,584,605 | A | 12/1996 | Beard et al. | 405/128 |
| 5,615,739 | A | 4/1997 | Dallas | 166/306 |
| 5,669,444 | A | 9/1997 | Riese et al. | 166/263 |

| | | | |
|---|---|---|---|
| 5,680,901 A | 10/1997 | Gardes | 166/313 |
| 5,690,390 A | 11/1997 | Bithell | 299/4 |
| 5,706,871 A | 1/1998 | Anderson et al. | 141/59 |
| 5,720,356 A | 2/1998 | Gardes | 175/62 |
| 5,727,629 A | 3/1998 | Blizzard, Jr. et al. | 166/298 |
| 5,735,350 A | 4/1998 | Longbottom et al. | 166/313 |
| 5,771,976 A | 6/1998 | Talley | 166/370 |
| 5,785,133 A | 7/1998 | Murray et al. | 175/61 |
| 5,832,958 A | 11/1998 | Cheng | 137/625.41 |
| 5,853,054 A | 12/1998 | McGarian et al. | 175/267 |
| 5,853,056 A | 12/1998 | Landers | 175/424 |
| 5,863,283 A | 1/1999 | Gardes | 588/250 |
| 5,868,202 A | 2/1999 | Hsu | 166/256 |
| 5,868,210 A | 2/1999 | Johnson et al. | 175/40 |
| 5,879,057 A | 3/1999 | Schwoebel et al. | 299/17 |
| 5,884,704 A | 3/1999 | Longbottom et al. | 16/313 |
| 5,917,325 A | 6/1999 | Smith | 324/326 |
| 5,934,390 A | 8/1999 | Uthe | 175/67 |
| 5,938,004 A | 8/1999 | Roberts et al. | 198/812 |
| 5,957,539 A | 9/1999 | Durup et al. | 299/4 |
| 5,971,074 A | 10/1999 | Longbottom et al. | 166/313 |
| 6,012,520 A | 1/2000 | Yu et al. | 166/245 |
| 6,015,012 A | 1/2000 | Reddick | 166/313 |
| 6,024,171 A | 2/2000 | Montgomery et al. | 166/308 |
| 6,050,335 A | 4/2000 | Parsons | 166/272.3 |
| 6,056,059 A | 5/2000 | Ohmer | 166/313 |
| 6,065,550 A | 5/2000 | Gardes | 175/62 |
| 6,119,771 A | 9/2000 | Gano et al. | 166/50 |
| 6,135,208 A | 10/2000 | Gano et al. | 166/313 |
| 6,209,636 B1 | 4/2001 | Roberts et al. | 166/117.6 |
| 6,280,000 B1 | 8/2001 | Zupanick | 299/12 |
| 6,349,769 B1 | 2/2002 | Ohmer | 166/313 |
| 6,357,523 B1 | 3/2002 | Zupanick | 166/52 |
| 6,425,448 B1 | 7/2002 | Zupanick et al. | 175/61 |
| 6,566,649 B1 | 5/2003 | Mickael | 250/269.3 |
| 6,571,888 B2 | 6/2003 | Comeau et al. | 175/61 |
| 6,577,129 B1 | 6/2003 | Thompson et al. | 324/338 |
| 6,585,061 B2 | 7/2003 | Radzinski et al. | 175/45 |
| 6,590,202 B2 | 7/2003 | Mickael | 250/269.2 |
| 6,591,903 B2 | 7/2003 | Ingle et al. | 166/50 |
| 6,607,042 B2 | 8/2003 | Hoyer et al. | 175/38 |
| 6,636,159 B1 | 10/2003 | Winnacker | 340/854.3 |
| 6,639,210 B2 | 10/2003 | Odom et al. | 250/269.6 |
| 6,646,411 B2 | 11/2003 | Thompson et al. | 324/338 |
| 6,653,839 B2 | 11/2003 | Yuratich et al. | 324/355 |
| 2002/0050358 A1 | 5/2002 | Algeroy et al. | 166/313 |
| 2002/0074120 A1 | 6/2002 | Scott | 166/313 |
| 2002/0074122 A1 | 6/2002 | Kelley et al. | |
| 2003/0066686 A1 | 4/2003 | Conn | 175/57 |
| 2003/0106686 A1 | 6/2003 | Ingle et al. | |

OTHER PUBLICATIONS

Berger and Anderson, "Modern Petroleum;" *PennWell Books*, pp. 106–108, 1978.

Howard L. Hartman, et al.; "SME Mining Engineering Handbook;" *Society for Mining, Metallurgy, and Exploration, Inc.*; pp. 1946–1950, 2nd Edition, vol. 2, 1992.

Dave Hassan, Mike Chernichen, Earl Jensen, and Morley Frank; "Multi–lateral technique lowers drilling costs, provides environmental benefits", *Drilling Technology*, pp. 41–47, Oct. 1999.

Joseph A. Zupanick; Declaration of Experimental Use with attached Exhibits A–D, dated Nov. 12, 2000, 308 total pages.

Gopal Ramaswamy, "Production History Provides CBM Insights," *Oil & Gas Journal*, pp. 49, 50 and 52, Apr. 2, 2001.

Weiguo Chi and Luwu Yang, "Feasibility of Coalbed Methane Exploitation in China," *Horizontal Well Technology*, p. 74, Sep. 2001.

Nackerud Product Description, *Harvest Tool Company,LLC*, 1 page.

U.S. patent application Ser. No. 09/444,029, entitled "Method and System for Accessing Subterranean Deposits From The Surface," filed Nov. 19, 1999, 52 pages.

U.S. patent application Ser. No. 09/773,217, entitled "Method and System for Accessing Subterranean Zones From a Limited Surface Area", filed Jan. 30, 2001, 72 pages.

U.S. patent application Ser. No. 09/769,098, entitled "Method and System for Enhanced Access to a Subterranean Zone," filed Jan. 24, 2001, 65 pages.

U.S. patent application Ser. No. 10/142,817, entitled "Method and System for Underground Treatment of Materials," filed May 8, 2002, 54 pgs.

U.S. patent application Ser. No. 09/774,996, entitled "Method and System for Accessing a Subterranean Zone From a Limited Surface Area," filed Jan. 30, 2001, 67 pages.

U.S. patent application Ser. No. 09/932,482, entitled "Single–Blade Underreamer," filed Aug. 17, 2001, 38 pages.

U.S. patent application Ser. No. 09/929,551, entitled "Pantograph Underreamer," filed Aug. 13, 2001, 27 pages.

U.S. patent application Ser. No. 10/046,001, entitled "Method and System for Management of By–Products From Subterranean Zones," filed Oct. 19, 2001. 42 pages.

U.S. patent application Ser. No. 09/932,487, entitled "Multi-–Blade Underreamer," filed Aug. 17, 2001, 38 pages.

U.S. patent application Ser. No. 09/786,956, entitled "Method and System for Accessing Subterranean Deposits From The Surface," filed Feb. 20, 2001, 54 pages.

U.S. patent application Ser. No. 09/788,897, entitled "Method and System for Accessing Subterranean Deposits From The Surface," filed Feb. 20, 2001, 54 pages.

U.S. patent application Ser. No. 09/791,033, entitled "Method and System for Accessing Subterranean Deposits From The Surface," filed Feb. 20, 2001, 50 pages.

U.S. patent application Ser. No. 09/885,219, entitled "Method and System for Accessing Subterranean Deposits From The Surface," filed Jun. 20, 2001, 52 pages.

U.S. patent application Ser. No. 09/929,175, entitled "Pantograph Underreamer," filed Aug. 13, 2001, 24 pages.

U.S. patent application Ser. No. 09/929,568, entitled "Pantograph Underreamer," filed Aug. 13, 2001, 25 pages.

U.S. patent application Ser. No. 10/003,917, entitled "Method and System for Surface Production of Gas from a Subterranean Zone," filed Nov. 1, 2001, 75 pages.

U.S. patent application Ser. No. 10/004,316, entitled "Slant Entry Well System and Method," filed Oct. 30, 2001, 35 pages.

U.S. patent application Ser. No. 10/165,627, entitled "Method and System for Accessing Subterranean Deposits from the Surface," filed Jun. 7, 2002, 26 pages.

U.S. patent application Ser. No. 10/165,625, entitled "Method and System for Accessing Subterranean Deposits from the Surface," filed Jun. 7, 2002, 26 pages.

U.S. patent application Ser. No. 10/079,444, entitled "Pantograph Underreamer," filed Feb. 19, 2002, 32 pages.

Gopal Ramaswamy, "Advances Key For Coalbed Methane," *The American Oil & Gas Reporter*, pp. 71 & 73, Oct. 2001.

Arfon H. Jones et al., A Review of the Physical and Mechanical Properties of Coal with Implications for Coal–Bed Methane Well Completion and Production, *Rocky Mountain Association of Geologists*, pp. 169–181, 1998.

Joseph C. Stevens, Horizontal Applications For Coal Bed Methane Recovery, *Strategic Research Institute*, pp. 1–10 (slides), Mar. 25, 2002.

Joseph A. Zupanick et al., U.S. patent application Ser. No. 10/123,561, entitled "Method and System for Accessing Subterranean Zones From a Limited Surface," filed Apr. 5, 2002, 49 pages.

Joseph A. Zupanick et al., U.S. patent application Ser. No. 10/123,556, entitled "Method and System for Accessing Subterranean Zones From a Limited Surface," filed Apr. 5, 2002, 49 pages.

Joseph A. Zupanick, U.S. patent application Ser. No. 10/188,141, entitled, "Method and System for Accessing a Subterranean Zone From a Limited Surface", filed Jul. 1, 2002, 46 pages.

Joseph A. Zupanick, U.S. patent application Ser. No. 10/194,366, entitled, "Undulating Well Bore", filed Jul. 12, 2002, 36 pages.

R.J. "Bob" Stayton, "Horizontal Wells Boost CBM Recovery", Special Report: Horizontal & Directional Drilling, *The American Oil & Gas Reporter*, pp. 71–75, Aug. 2002.

Robert W. Taylor and Richard Russell, Multilateral Technologies Increase Operational Efficiencies in Middle East, Oil & Gas Journal, pp. 76–80, Mar. 16, 1998.

Adam Pasiczynk, "Evolution Simplifies Multilateral Wells", Directional Drilling, pp. 53–55, Jun. 2000.

Steven S. Bell, "Multilateral System with Full Re–Entry Access Installed", World Oil, p. 29, Jun. 1996.

P. Jackson and S. Kershaw, Reducing Long Term Methane Emissions Resulting from Coal Mining, Energy Convers. Mgmt, vol. 37, Nos. 6–8, pp. 801–806, 1996.

Pascal Breant, "Des Puits Branches, Chez Total : les puits multi drains", Total Exploration Production, pp. 1–5, Jan. 1999.

Susan Eaton, "Reversal of Fortune", New Technology Magazine, pp. 30–31, Sep. 2002.

James Mahony, "A Shadow of Things to Come", New Technology Magazine, pp. 28–29, Sep. 2002.

Documents Received from Third Party, Great Lakes Directional Drilling, Inc., (12 pages).

Notification of Transmittal of the International Search Report or the Declaration (PCT Rule 44.1) mailed Nov. 6, 2003 (8 pages) re International Application No. PCT/US 03/21626, filed Jul. 11, 2003.

* cited by examiner

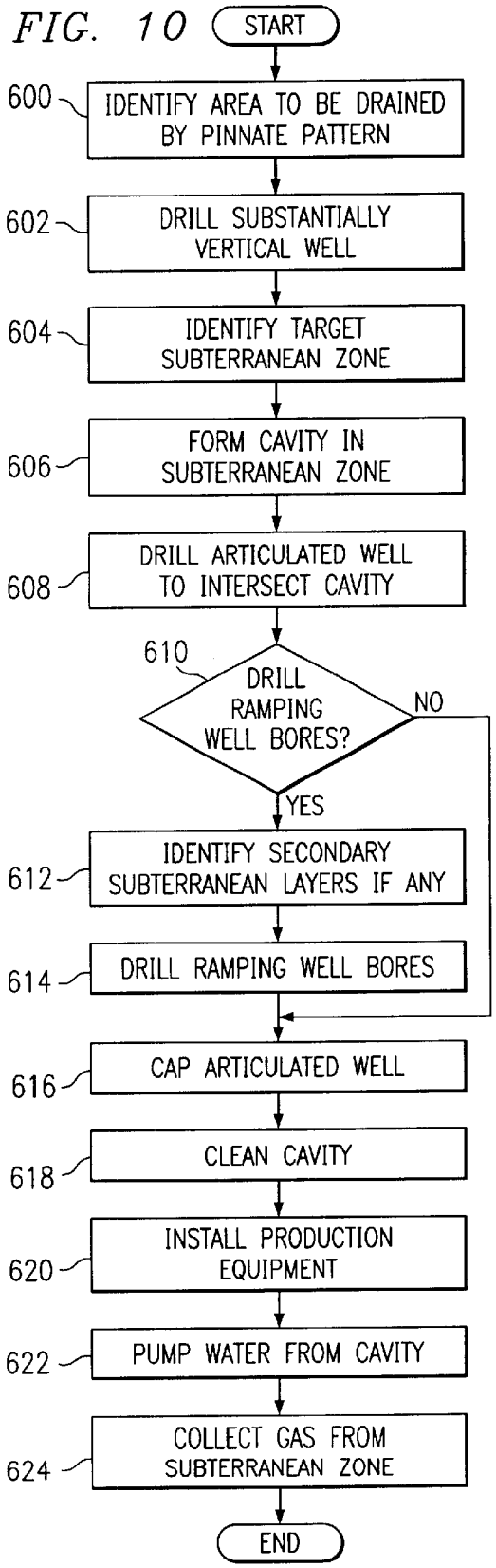

RAMPING WELL BORES

TECHNICAL FIELD OF THE INVENTION

The present invention relates generally to the recovery of subterranean deposits, and more particularly to a method and system for accessing subterranean deposits from the surface.

BACKGROUND OF THE INVENTION

Subterranean deposits of coal typically contain substantial quantities of entrained methane gas. There are many uses for methane gas extracted from the subterranean deposits. Substantial obstacles, however, have frustrated more extensive development and use of methane gas deposits in coal seams. A common problem in producing methane gas from coal seams may be vertical separation of multiple thin layers of coal within a coal seam. Although coal seams may extend over large areas of up to several thousand acres, the depth of the multiple layers in the coal seam may vary from very shallow to very deep. Vertical wells drilled into the coal deposits for obtaining methane gas can only drain a fairly small radius around the coal deposits. Further, coal deposits are not amenable to pressure fracturing and other methods often used for increasing gas production from conventional rock formations. As a result, production of gas may be limited in volume. Additionally, coal seams are often associated with subterranean water, which must be drained from the coal seam in order to produce the methane.

SUMMARY OF THE INVENTION

The present invention provides an improved method and system for accessing subterranean deposits from the surface that substantially eliminates or reduces the disadvantages and problems associated with previous systems and methods. In particular, the present invention provides an articulated well with a drainage pattern that provides access to a large subterranean area from the surface.

In accordance with one embodiment of the present invention, a subterranean drainage pattern for accessing a subterranean zone includes a main well bore extending from a surface well bore, located at a first end of the area, to a second end of the area. A first plurality of lateral well bores extend in spaced apart relation to each other from the main well bore to the periphery of the area on a first side portion of the main well bore. A second plurality of lateral well bores extend in spaced apart relation to each other from the main well bore to a periphery of the area on a second, opposite side portion of the main well bore. A first plurality of ramping well bores extend in spaced apart relation to each other from the main well bore toward a boundary of the subterranean zone.

Embodiments of the present invention may have some, all, or none of the following advantages. In particular embodiments, an improved multi-plane drainage pattern may include upwardly ramping well bores and/or downwardly ramping well bores to maximize access to a subterranean zone. Upwardly ramping well bores may extend upwardly from the main well bore to maximize access to the upper portion of a single, thick layer of subterranean deposits. Alternatively or additionally, upwardly ramping well bores may extend upwardly from the main well bore to maximize access to multiple layers of subterranean deposits. Similarly, downwardly ramping well bores may extend downwardly from the main well bore to maximize access to a lower portion of a single, thick layer of subterranean deposits and/or to maximize access to multiple layers of subterranean deposits separated by impermeable or substantially impermeable material. In particular embodiments, multi-plane drainage pattern may include lateral well bores in addition to upwardly ramping well bores. Lateral well bores may extend from opposite sides of the main well bore in a substantially horizontal plane to provide greater access to an area of the subterranean zone. A further technical advantage may include maximizing the area covered by the drainage pattern both horizontally and vertically while reducing the number of times a drill string changes direction while drilling a bore hole. Consequently, disadvantages arising from differences in pressure head caused by vertical curves in a well bore may be substantially reduced.

Other technical advantages of the present invention will be readily apparent to one skilled in the art from the figures, description, and claims, included herein.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 10 is a flow diagram illustrating an example method for producing gas from a subterranean zone.

DETAILED DESCRIPTION OF THE INVENTION

Figure 1:
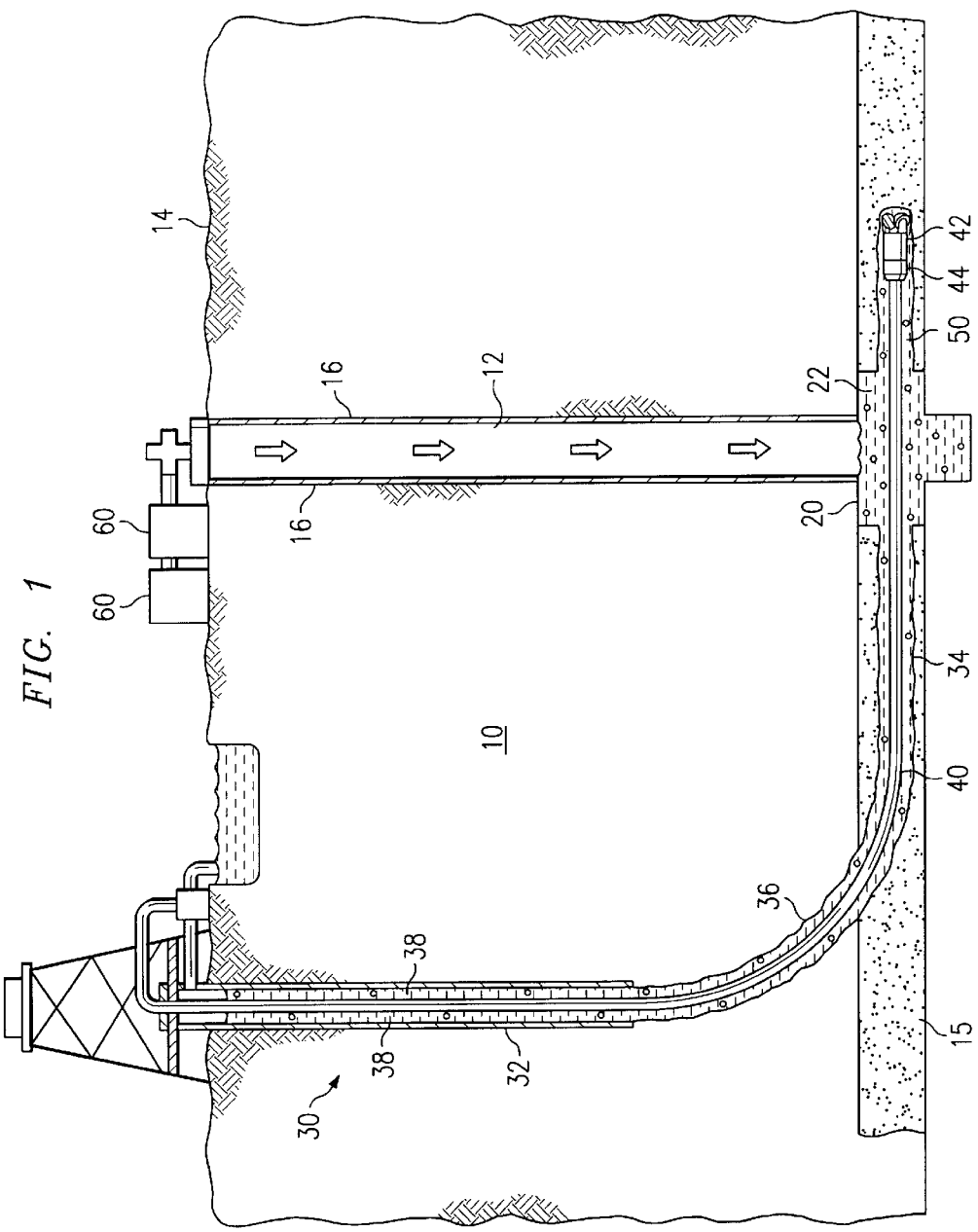
FIG. 1 is a cross-sectional diagram illustrating the drilling of an example dual well system for accessing a subterranean zone from the surface.

FIG. 1 is a cross-sectional diagram illustrating the drilling of an example dual well system for accessing a subterranean zone from the surface. In one embodiment, the subterranean zone may be a coal seam. It will be understood that other subterranean zones can be similarly accessed using the dual well system of the present invention to remove and/or produce water, hydrocarbons and other fluids in the zone and to treat minerals in the zone prior to mining operations.

In addition to production, the dual well system may be used for environmental remediation purposes to treat or recover underground contaminants posing a danger to the environment. Remediation may include neutralizing leaching, recovery, dissolving, oxidation, reduction, or other suitable process. For example, the dual well system may be used to inject a treatment solution into a contaminated coal seam or surrounding area. The treatment solution may comprise either a liquid or a gas. Where treatment includes biological processes or biological mediated processes (including bioremediation), the treatment solution may include bacteria, nutrients, or other materials which may affect the metabolism, respiration, or other processes of bacteria or other organisms. The dual well system may also be used to recover byproducts from the contaminated coal seam or surrounding area or to strip recoverable product from the coal seam.

Dual well system may also be used for the sequestration of gaseous emissions from internal combustion engines, or other materials for which disposal by underground sequestration may be appropriate. For example, certain underground formations such as coal have high absorption affinities for carbon dioxide, sulfur oxides, nitrogen oxides, and/or other gases or other materials that may comprise regulated substances or pollutants. Thus, materials such as carbon dioxide may be sequestered in a sequestration zone such as a coal seam. Well bore patterns may be drilled proximate to the sequestration zone (adjacent to and/or within the zone) and the materials injected into the well bore patterns. In a particular embodiment, the materials comprise gases such as carbon dioxide that may first be entrained in water or another liquid. The liquid may act as a carrier medium, and the gas/carrier medium mixture pumped into the well bore patterns with the aid of a surface pump. The pinnate pattern may provide for an increased surface area of the underground injection zone, thus providing for more efficient and effective sequestration.

Referring to FIG. 1, a substantially vertical well bore 12 extends from the surface 14 to a target layer subterranean zone 15. The substantially vertical well bore 12 intersects, penetrates and continues below the subterranean zone 15. The substantially vertical well bore may be lined with a suitable well casing 16 that terminates at or above the level of the coal seam or other subterranean zone 15.

The substantially vertical well bore 12 may be logged either during or after drilling in order to locate the exact vertical depth of the target subterranean zone 15. As a result, subterranean zone 15 is not missed in subsequent drilling operations, and techniques used to locate the zone 15 while drilling need not be employed. An enlarged diameter cavity 20 may be formed in the substantially vertical well bore 12 at a level of or in the subterranean zone 15. As described in more detail below, the enlarged diameter cavity 20 provides a junction for intersection of the substantially vertical well bore 12 by an articulated well bore 30 used to form a drainage pattern in the subterranean zone 15. However, drilling techniques may also be used that eliminate the need for an enlarged cavity in order to intersect vertical well bore 12. The enlarged diameter cavity 20 also may provide a collection point for fluids drained from the subterranean zone 15 during production operations.

In one embodiment, the enlarged diameter cavity 20 has a radius of approximately eight feet and a vertical dimension that equals or exceeds the vertical dimension of the subterranean zone 15; however, any appropriate radius may be used (and the cavity many not be cylindrical) and the vertical dimension of the cavity many not extend out of subterranean zone 15. The enlarged diameter cavity 20 may be formed using suitable under-reaming techniques and equipment. A vertical portion of the substantially vertical well bore 12 may continue below the enlarged diameter cavity 20 to form a sump 22 for the cavity 20.

An articulated well bore 30 extends from the surface 14 to the enlarged diameter cavity 20 of the substantially vertical well bore 12. The articulated well bore 30 may include a substantially vertical portion 32, a substantially horizontal portion 34, and a curved or radiused portion 36 interconnecting the vertical and horizontal portions 32 and 34. In one embodiment, the horizontal portion 34 lies substantially in the horizontal plane of subterranean zone 15 and intersects the large diameter cavity 20 of the substantially vertical well bore 12. One skilled in the art may recognize, however, that the substantially horizontal portion 34 need not be precisely horizontal where the subterranean zone itself is not precisely horizontal. Rather, substantially horizontal portion 34 merely implies that the portion 34 is in conformance with the general shape of subterranean zone 15. Thus, if subterranean zone 15 is inclined, substantially horizontal portion 34 may also be inclined in conformance with the plane of the subterranean zone 15.

Articulated well bore 30 is offset a sufficient distance from the substantially vertical well bore 12 at the surface 14 to permit the large radius curved section 36 and any desired horizontal section 34 to be drilled before intersecting the enlarged diameter cavity 20. In one embodiment, the articulated well bore 30 is offset a distance of about three hundred feet from the substantially vertical well bore 12 to provide the curved portion 36 with a radius of one hundred to one hundred and fifty feet. This spacing minimizes the radius of the curved portion 36 to reduce friction in the bore 30 during drilling operations. As a result, reach of the articulated drill string drilled through the articulated well bore 30 is maximized. One skilled in the art may recognize, however, that a distance of three hundred feet and a radius of one hundred to one hundred and fifty feet is merely exemplary. The radius of curved portion 36 may be any other suitable radius that allows articulated well bore to curve and access subterranean zone 15. Accordingly, the distance between the articulated well bore 30 and the substantially vertical well bore 12 may be any suitable distance allowing the articulated well bore 30 to intersect the enlarge diameter cavity 20.

Articulated well bore 30 may be drilled using articulated drill string 40 that includes a suitable down-hole motor and bit 42. A measurement while drilling (MWD) device 44 may be included in the articulated drill string 40 for controlling the orientation and direction of the well bore drilled by the motor and bit 42. Any portion of the articulated well bore 30 may be lined with a suitable casing 38.

After the enlarged diameter cavity 20 has been successfully intersected by the articulated well bore 30, drilling is continued through the cavity 20 using the articulated drill string 40 and appropriate horizontal drilling apparatus to provide a drainage pattern in the subterranean zone 15 that initiates from cavity 20 as main well bore 50. Main well bore 50 and other such well bores may include sloped, undulating, or other inclinations of the coal seam or other subterranean zone 15. Although FIG. 1 shows only a beginning portion of the main well bore 50, main well bore 50 may extend further into subterranean zone 15. Additional well bores may extend from the main well bore 50 to form a drainage pattern. During this operation, gamma ray logging tools and conventional MWD devices may be employed to control and direct the orientation of the drill bit to retain the main well bore 50 within the confines of the subterranean zone 15 and to provide substantial coverage of a desired area within the subterranean zone 15. Various types of drainage patterns are described in more detail below in connection with FIGS. 4–14.

During the process of drilling the drainage pattern 50, drilling fluid or "mud" may be pumped down the articulated drill string 40 and circulated out of the drill string 40 in the vicinity of the bit 42. Mud may be used to scour the formation and to remove formation cuttings. The cuttings are then entrained in the drilling fluid which circulates up through the annulus between the drill string 40 and the well bore walls until it reaches the surface 14. Cuttings may be removed from the drilling fluid and the fluid may then be recirculated. This conventional drilling operation produces a standard column of drilling fluid having a vertical height equal to the depth of the well bore 30 and produces a hydrostatic pressure on the well bore corresponding to the well bore depth. Because coal seams tend to be porous and fractured, they may be unable to sustain such hydrostatic pressure, even if formation water is also present in the coal seam. Accordingly, if the full hydrostatic pressure is allowed to act on the coal seam, the result may be loss of drilling fluid and entrained cuttings into the formation. Such a circumstance is referred to as an "over-balanced" drilling operation in which the hydrostatic fluid pressure in the well bore exceeds the ability of the formation to withstand the pressure. Loss of drilling fluids in cuttings into the formation not only is expensive in terms of the lost drilling fluids, which must be made up, but it tends to plug the pores in the coal seam, which are needed to drain the coal seam of gas and water.

To prevent over balance drilling conditions during formation of drainage pattern that may include main well bore 50, air compressors 60 may be provided to circulate compressed air down the substantially vertical well bore 12 and back up through the articulated well bore 30. The circulated air will admix with the drilling fluids in the annulus around the articulated drill string 40 and create bubbles throughout the column of drilling fluid. This has the effect of lightening the hydrostatic pressure of the drilling fluid and reducing the down-hole pressure sufficiently such that drilling conditions do not become over-balanced. Aeration of the drilling fluid may reduce down-hole pressure to approximately 150–200 pounds per square inch (psi), in particular embodiments. Accordingly, low-pressure coal seams and other subterranean zones can be drilling without substantial loss of drilling fluid and contamination of the zone by the drilling fluid.

Foam, which may include compressed air mixed with water, may be circulated down through the articulated drill string 40 along with the drilling mud in order to aerate the drilling fluid in the annulus, if desired, as the drainage pattern is being drilled. Drilling of the drainage pattern with the use of an air hammer bit or an air-powered down-hole motor will also supply compressed air or foam to the drilling fluid. In this case, the compressed air or foam, which is used to power the bit or down-hole motor, exits in the vicinity of the drill bit 42. However, the larger volume of air which can be circulated down the substantially vertical well bore 12, permits greater aeration of the drilling fluid than generally is possible by air supplied through the articulated drill string 40.

Figure 2:
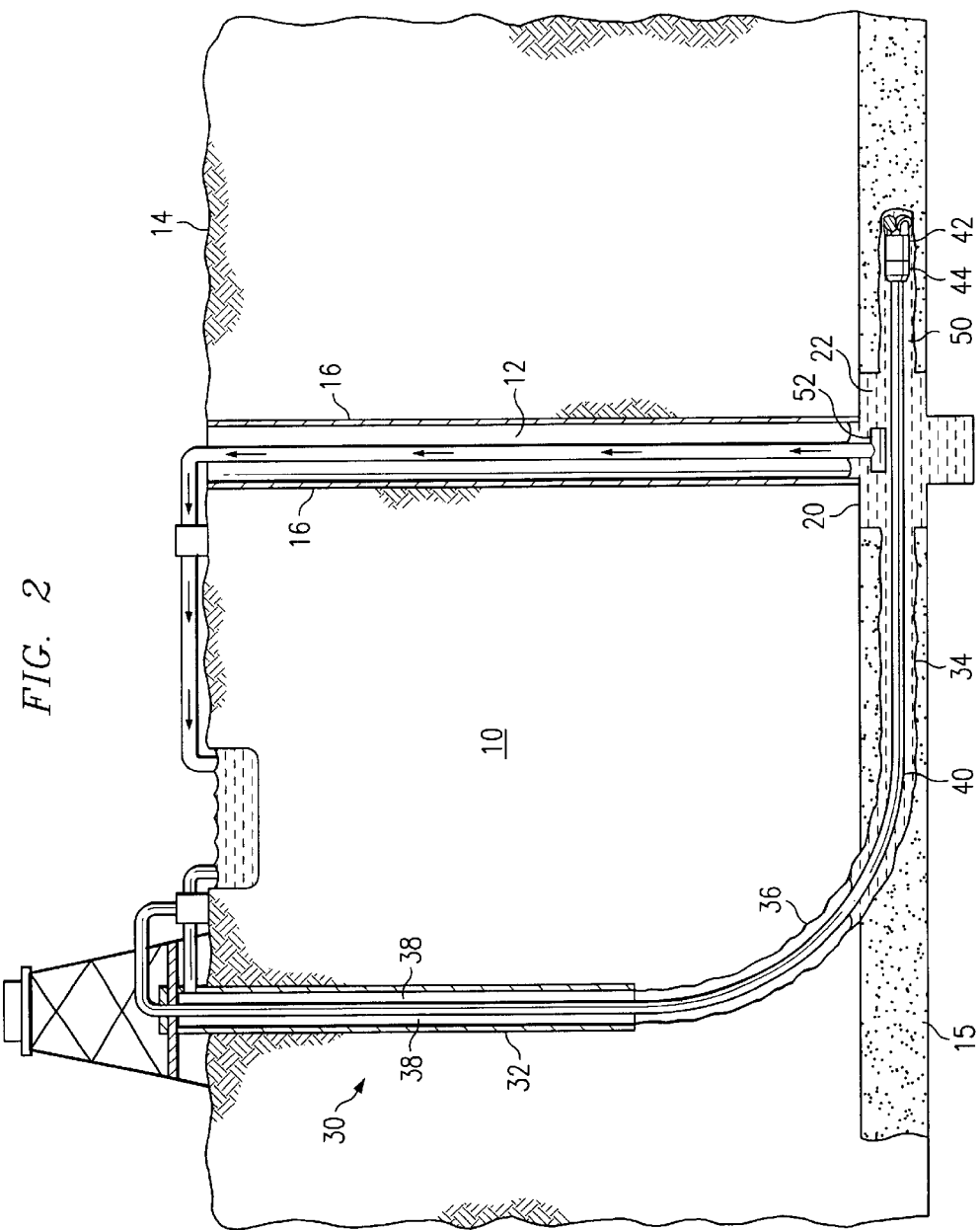
FIG. 2 is a cross-sectional diagram illustrating the drilling of an example dual well system for accessing a subterranean zone from the surface.

FIG. 2 is a cross-sectional diagram illustrating the drilling of an example dual well system for accessing a subterranean zone from the surface. In this embodiment, the substantially vertical well bore 12, enlarged diameter cavity 20 and articulated well bore 32 may be positioned and formed as previously described in connection with the FIG. 1.

Referring to FIG. 2, after intersection of the enlarged diameter cavity 20 by the articulated well bore 30, a pump 52 is installed in the enlarged diameter cavity 20 to pump drilling fluid and cuttings to the surface 14 through the substantially vertical well bore 12. This eliminates the variable friction of air and fluid returning up the articulated well bore 30 and reduces down-hole pressure to any desired value. Accordingly, coal seams and other subterranean zones having ultra low pressures below 150 psi can be accessed from the surface 14. Additionally, the risk of combining air and methane in the well is eliminated.

Figure 3:
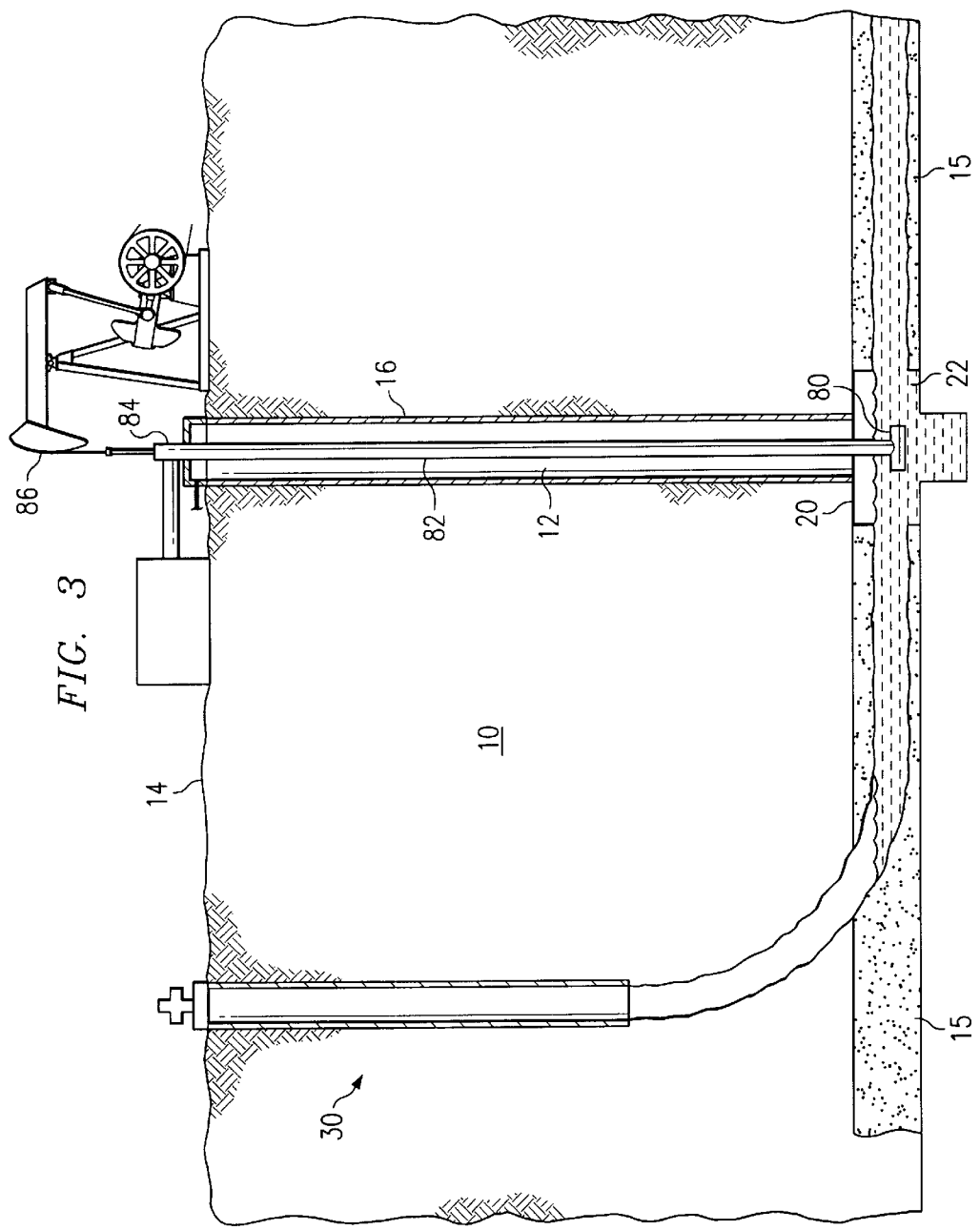
FIG. 3 is a cross-sectional diagram illustrating the use of an example dual well system for the production of fluids.

FIG. 3 is a cross-sectional diagram illustrating the use of an example dual well system for the production of fluids. In this embodiment, after the substantially vertical and articulated well bores 12 and 30 as well as desired drainage pattern have been drilled, the articulated drill string 40 is removed from the articulated well bore 30 and the articulated well bore is capped. A down hole pump 80 is disposed in the substantially vertical well bore 12 in the enlarged diameter cavity 20. The enlarged cavity 20 provides a reservoir for accumulated fluids allowing intermittent pumping without adverse effects of a hydrostatic head caused by accumulated fluids in the vertical well bore 12.

The down hole pump 140 is connected to the surface 14 via a tubing string 82 and may be powered by sucker rods 84 extending down through the well bore 12 of the tubing. The sucker rods 84 are reciprocated by a suitable surface mounted apparatus, such as a powered walking beam 86 to operate the down hole pump 80. The down hole pump 80 may be used to remove water and entrained fines from the subterranean zone 15 via the drainage pattern. Alternatively or additionally, down hole pump 80 may be used in remediation processes to inject treatment solution into a contaminated area or in sequestration processes to inject gaseous emissions entrained in a carrier medium. Once the water is removed to the surface, it may be treated to remove methane or other gas dissolved in the water and entrained fines. After sufficient water has been removed from the subterranean, gas may be allowed to flow to the surface 14 through the annulus of the substantially vertical well bore 12 around the tubing string 82 and removed via piping attached to a wellhead apparatus. At the surface 14, the gas may be treated, compressed and pumped through a pipeline for use as a fuel in a conventional manner. The down hole pump 80 may be operated continuously or as needed to remove water drained from the coal seam into the enlarged diameter cavity 20.

Figure 4:
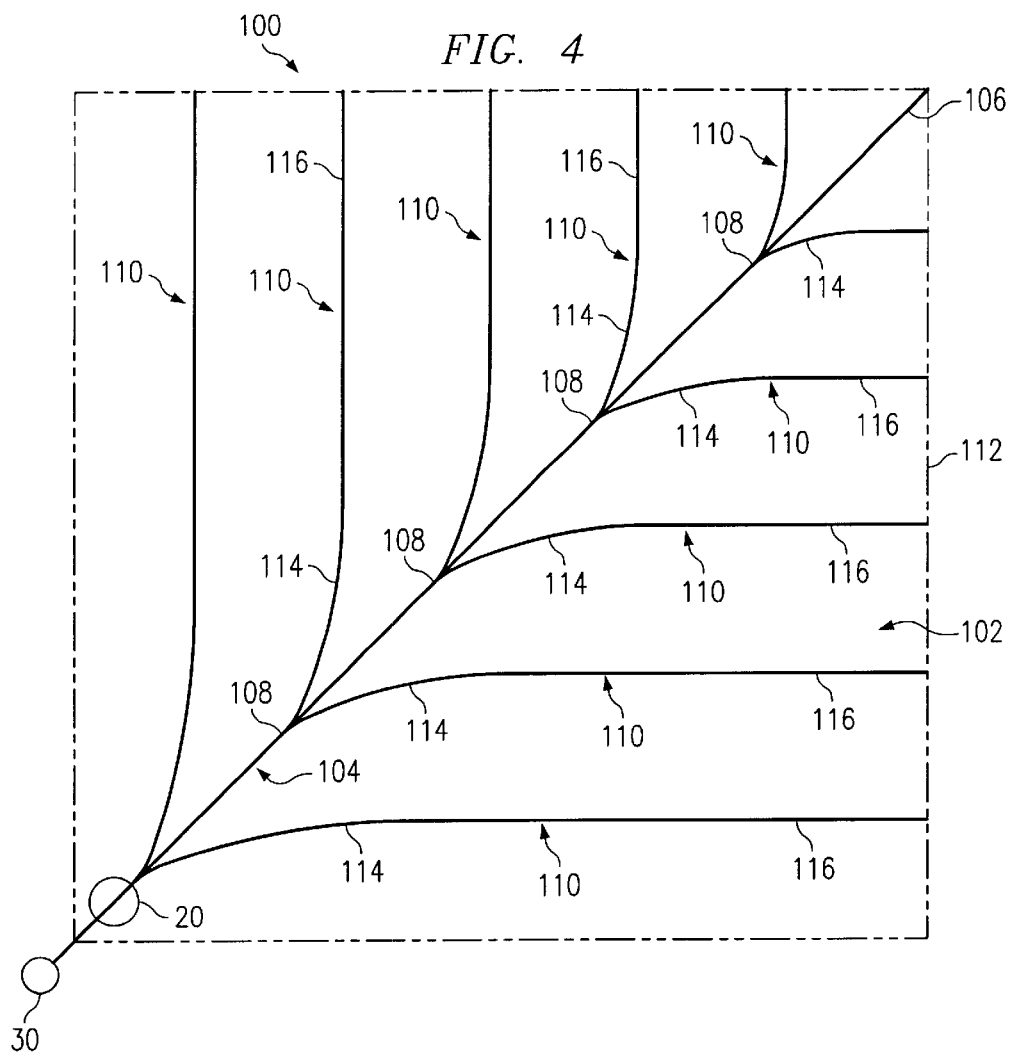
FIG. 4 is a top plan diagram illustrating an example pinnate drainage pattern for accessing deposits in a subterranean zone.
Figure 5:
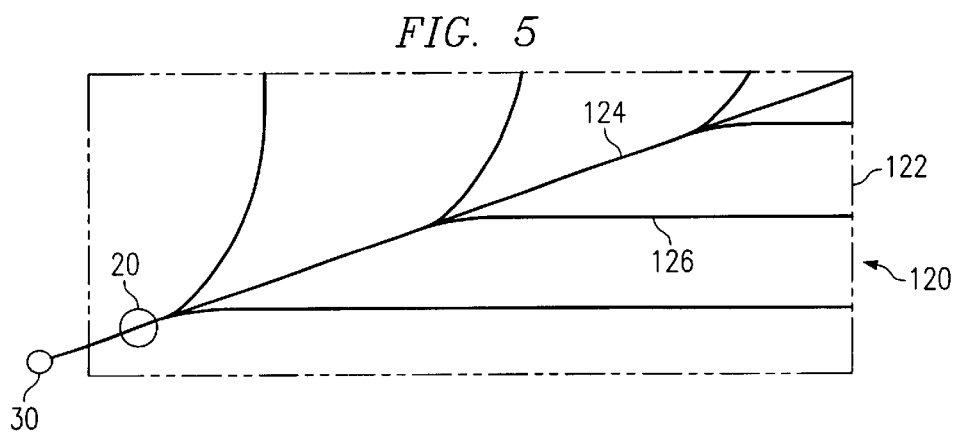
FIG. 5 is a top plan diagram illustrating an example pinnate drainage pattern for accessing deposits in a subterranean zone.
Figure 6:
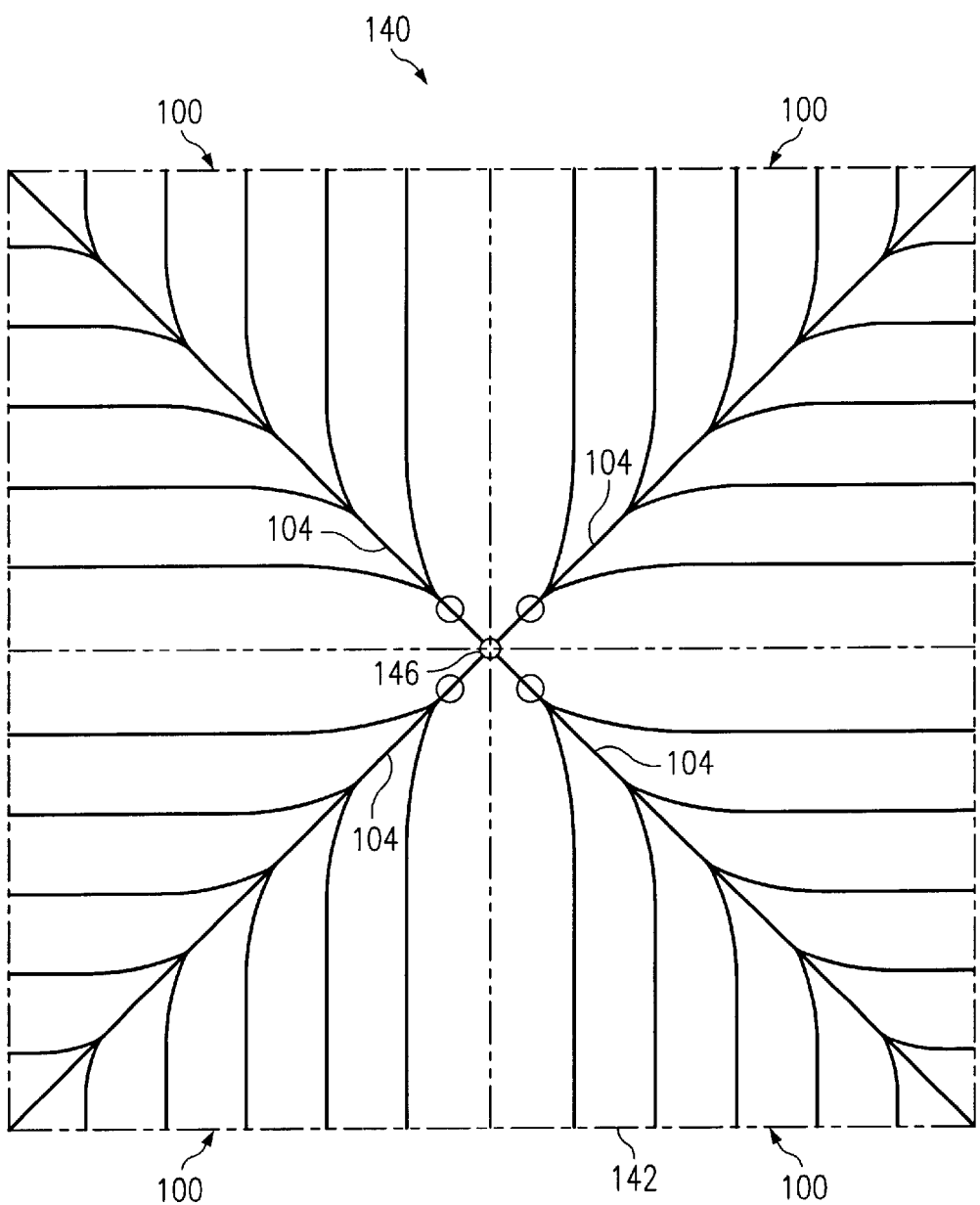
FIG. 6 is a top plan diagram illustrating an example quadrilateral pinnate drainage pattern for accessing deposits in a subterranean zone.

FIGS. 4–6 are top plan diagrams illustrating example pinnate drainage patterns for accessing deposits in a subterranean zone. In the example embodiments, the drainage patterns may comprise pinnate patterns that have a main drainage well bore 104 with generally symmetrically arranged and appropriately spaced lateral well bores 110 extending from each side of the main drainage well bore. The pinnate pattern approximates the pattern of veins in a leaf or the design of a feather in that it has similar, substantially parallel, lateral drainage bores 110 arranged in substantially equal and parallel spacing on opposite sides of an axis. The pinnate drainage pattern with its main drainage well bore 104 and generally symmetrically arranged and appropriately spaced lateral drainage bores 110 on each side provides a uniform pattern for draining fluids from a coal seam or other subterranean formation. As described in more detail below, the pinnate pattern may provide substantially uniform coverage of a square, other quadrilateral, or grid area and may be aligned with longwall mining panels for preparing the subterranean 15 for mining operations. It will be understood that other suitable drainage patterns may be used in accordance with the present invention.

The pinnate and other suitable drainage patterns drilled from the surface provide surface access to subterranean formations. The drainage pattern may be used to uniformly remove and/or insert fluids or otherwise manipulate a subterranean deposit. In non-coal applications, the drainage pattern may be used initiating in-situ burns, "huff-puff" steam operations for heavy crude oil, and the removal of hydrocarbons from low porosity reservoirs.

FIG. 4 is a top plan diagram illustrating an example pinnate drainage pattern 100 for accessing deposits in a subterranean zone 15 in accordance with one embodiment of the present invention. In this embodiment, the pinnate drainage pattern 100 provides access to a substantially square area 102 of a subterranean zone. A number of the pinnate patterns 100 may be used together to provide uniform access to a large subterranean region.

The enlarged diameter cavity 20 defines a first corner of the area 102. The pinnate pattern 100 includes a substantially horizontal main drainage well bore 104 extending diagonally across the area 102 to a distant corner 106 of the area 102. One skilled in the art may recognize, however, that the substantially horizontal main drainage well bore 104 need not be precisely horizontal where the subterranean zone itself is not precisely horizontal. Rather, substantially horizontal merely means that well bore 104 is in conformance with the shape of subterranean zone 15. If subterranean zone 15 is inclined, the substantially horizontal main drainage well bore 104 may also be inclined in conformance with the plane of the subterranean zone 15. In particular embodiments, the substantially vertical and articulated well bores 12 and 30 may be positioned over the area 102 such that the main drainage well bore 104 is drilled up the slope of the subterranean zone 15. This may facilitate collection of water, gas from the area 102. The main drainage well bore 104 is drilled using the articulated drill string 40 and extends from the enlarged cavity 20 in alignment with the articulated well bore 30.

A plurality of lateral well bores 110 may extend from opposite sides of main drainage well bore 104 to a periphery 112 of the area 102. The lateral bores 110 may mirror each other on opposite sides of the main drainage well bore 104 or may be offset from each other along the main drainage well bore 104. Each of the lateral bores 110 includes a radiused portion 114 coming off of the main drainage well bore 104 and an elongated portion 116 formed after the curved portion 114 has reached a desired orientation. For uniform coverage of the square area 102, pairs of lateral bores 110 may be substantially evenly spaced on each side of the main drainage well bore 104 and extend from the main drainage well bore 104 at an angle of approximately 45 degrees. The lateral bores 110 may shorten in length based on progression away from the enlarged diameter cavity 20 in order to facilitate drilling of the lateral bores 110.

In a particular embodiment, a pinnate drainage pattern 100 including a main drainage well bore 104 and five pairs of lateral bores 110 may drain a subterranean zone 15 of approximately 150 acres in size. Where a smaller area is to be drained, or where the subterranean zone 15 has a different shape, such as a long, narrow shape or due to surface or subterranean topography, alternate pinnate drainage patterns may be employed by varying the angle of the lateral bores 110 to the main drainage well bore 104 and the orientation of the lateral bores 110. Alternatively, lateral bores 120 can be drilled from only one side of the main drainage well bore 104 to form a one-half pinnate pattern.

The main drainage well bore 104 and the lateral bores 110 are formed by drilling through the enlarged diameter cavity 20 using the articulated drill string 40 and appropriate horizontal drilling apparatus. During this operation, gamma ray logging tools and conventional MWD technologies may be employed to control the direction and orientation of the drill bit so as to retain the drainage pattern within the confines of the subterranean zone 15 and to maintain proper spacing and orientation of the main drainage well bore and lateral bores 104 and 110.

FIG. 5 is a top plan diagram illustrating an example pinnate drainage pattern 120 for accessing deposits in a subterranean zone. In this embodiment, pinnate drainage pattern 120 drains a substantially rectangular area 122 of the subterranean zone 15. Pinnate drainage pattern 120 includes a main drainage well bore 124 and a plurality of lateral bores 126 that are formed as described in connection with main drainage well bore 104 and lateral bores 110 of FIG. 4. For the substantially rectangular area 122, however, the lateral bores 126 on a first side of the main drainage well bore 124 include a shallow angle while the lateral bores 126 on the opposite side of the main drainage well bore 124 include a steeper angle to together provide uniform coverage of the area 12.

FIG. 6 is a top plan diagram illustrating an example quadrilateral pinnate drainage pattern 140 for accessing deposits in a subterranean zone. The quadrilateral drainage pattern 140 includes four discrete pinnate drainage patterns 100 each draining a quadrant of a region 142 covered by the pinnate drainage pattern 140.

Each of the pinnate drainage patterns 100 may include a main drainage well bore 104 and a plurality of lateral well bores 110 extending from the main drainage well bore 104. In the quadrilateral embodiment, each of the main drainage well bore and lateral bores 104 and 110 are drilled from a common articulated well bore 141. This allows tighter spacing of the surface production equipment, wider coverage of a drainage pattern and reduces drilling equipment and operations.

Figure 7:
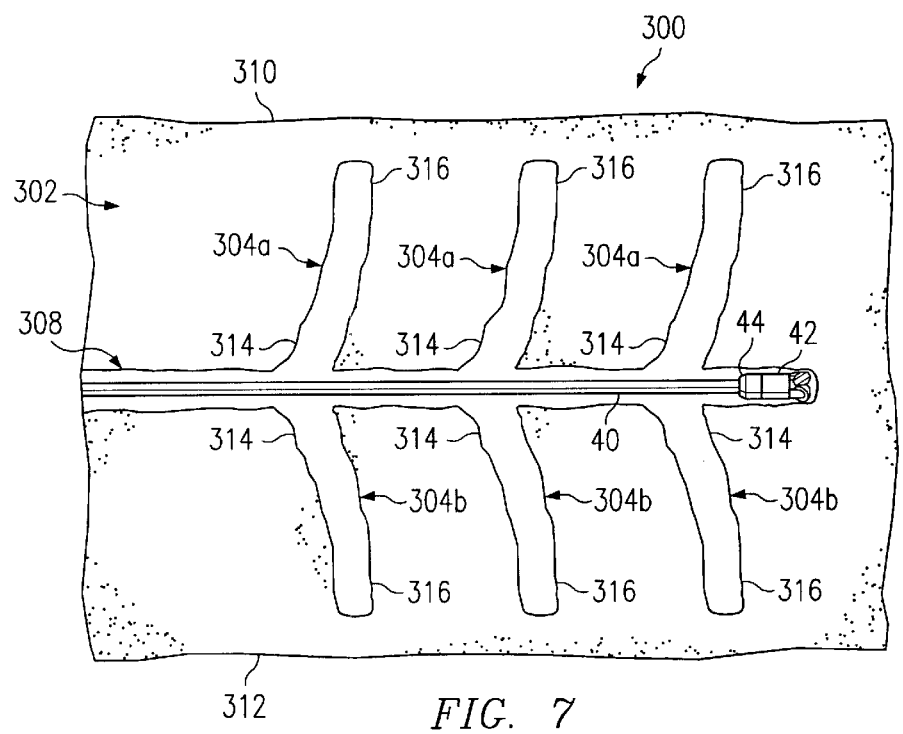
FIG. 7 is a cross-sectional diagram illustrating an example multi-plane well bore pattern for accessing a single, thick layer of subterranean deposits.

FIG. 7 is a cross-sectional diagram illustrating an example multi-plane well bore pattern 300 for accessing deposits in a single, thick layer 302 of subterranean deposits. The multi-plane well bore pattern 300 may include one or more ramping well bores 304 that may be used to remove and/or produce water, hydrocarbons, and other fluids in layer 302. Ramping well bores 304 may also be used in remediation processes to treat or remove contaminants in a coal seam or the surrounding area or in sequestration processes to dispose of gaseous pollutants and emissions. In one example embodiment, layer 302 of subterranean deposits may comprise a coal seam or other subterranean zone. Additionally or alternatively, layer 302 of subterranean deposits may comprise a thick, single layer of hydrocarbons or other extractable substances. For example, the single, thick layer 302 may be approximately fifty feet thick as measured from an upper boundary 310 closest to the earth's surface to a lower boundary 312 furthest from the earth's surface. Fifty feet is, however, merely exemplary; one skilled in the art may recognized that layer 302 may be of any thickness appropriate for drainage by multi-plane well bore pattern 300. One skilled in the art may also recognize that the layer 302 may include any impurities that may be separated from the subterranean deposits before or after extraction. Additionally or alternatively, layer 302 of subterranean deposits may also include partings of shale or other impermeable or substantially impermeable material.

Each ramping well bore 304 may include a radiused portion 314 and an elongated portion 316. The radiused portion 314 may connect the ramping well bore 304 to a substantially horizontal well bore 308 at a predetermined radius of curvature. The appropriate radius of curvature may be dictated by drilling apparatus capabilities and/or by the dimensions of the area to be drained by the multi-plane drainage pattern 300. Radiused portion 314 may then transition to an elongated portion 316. Elongated portion 316 may extend in a substantially vertical, inclined, or declined direction to a distant point within layer 302. One skilled in the art may recognize that elongated portion 316 may not necessarily include a perfectly straight well bore. It may be appreciated that the path of elongated portion 316 may include normal inaccuracies of drilling. Because operation of a drill string 40 through a subterranean zone may not be visually monitored, inaccuracies may result in the positioning of the drill bit. As a result, drill string 40 may vary slightly from the operator's intended path. Such minor variations and deviations do not change the substantially vertical characteristics of elongated portion 316. Rather, minor variations and deviations are within the intended scope of the invention. In other particular embodiments, ramping well bore 304 may extend from the substantially horizontal well bore 308 such that elongated portion 316 is offset at any appropriate angle from the substantially horizontal well bore 308.

Ramping well bores 304 may extend upwardly from the substantially horizontal well bore 308 toward the upper boundary 310 of the layer 302. Alternatively or additionally, ramping well bores 304 may extend downwardly from the substantially horizontal well bore 308 toward the lower boundary 312 of the layer 302. Ramping well bores 304 may extend in a substantially vertical direction to a distant point within layer 302. Thus, in one embodiment, multi-plane drainage pattern 300 may include a first set of ramping well bores 304a extending from an upper portion of the substantially horizontal well bore 308 and a second set of ramping well bores 304b extending from a lower portion of the substantially horizontal well bore 308. The first and second sets of ramping well bores 304 may mirror each other on opposite sides of the substantially horizontal well bore 308 or may be offset from each other along the substantially horizontal well bore 308. Thus, upwardly ramping well bores 304a and downwardly ramping well bores 304b need not necessarily extend from similar points along the substantially horizontal well bore 308.

Further, ramping well bores 304 may be substantially evenly spaced along the upper and lower portions of the substantially horizontal portion 308. For example, ramping well bores 304a may extend upwardly from substantially horizontal well bore 308 at evenly spaced intervals of one hundred feet. Similarly, ramping well bores 304b may extend downwardly from the substantially horizontal well bore 308 at evenly spaced intervals of one hundred feet. In other embodiments, the spacing between ramping well bores 304 may vary. Thus, the interval spacing between the first ramping well bore 304 and the second ramping well bore 304 may approximate one hundred feet; the interval spacing between the second ramping well bore 304 and the third ramping well bore 304 may approximate instead two hundred feet. One skilled in the art may recognize that the above described interval spacings are merely provided as an example. The interval spacings may include any appropriate interval spacing for effectively drilling ramping well bores 304.

In particular embodiments, substantially horizontal well bore 308 may be the main well bore 104 of a drainage pattern. Substantially horizontal well bore 308 may lie in the substantially horizontal plane of layer 302 and intersect the large diameter cavity 20 of the substantially vertical well bore 12. Although well bore 308 is described as substantially horizontal, one skilled in the art may recognize that substantially horizontal well bore 308 need not necessarily be perfectly horizontal where the layer is not perfectly horizontal. Rather, substantially horizontal merely implies that the well bore 308 is in conformance with the shape of the layer 302. Thus, if layer 302 inclines upward toward the earth's surface, substantially horizontal well bore 308 may also incline toward the earth's surface in conformance with the plane of the layer 302.

In other embodiments, substantially horizontal well bore 308 may alternatively or additionally be lateral well bore 110 extending from a main drainage well bore 104, as was also described with regard to FIG. 4. For example, substantially horizontal portion 308 may replace all or a part of the elongated portion 116 of the lateral well bore 110. Multi-plane well bore pattern 300 may merely include a main drainage well bore 104 with ramping well bores 304. Alternatively, multi-plane well bore pattern 300 may include a main drainage well bore 104, lateral well bores 110, and ramping well bores 304 extending from the main drainage well bore 104 and/or the lateral well bores 110 or any other combination thereof. Because ramping well bores 304 may extend from lateral well bores 110 or main drainage well bores 104, multi-plane drainage pattern may be modified as appropriate to adequately drain layer 302.

Other variations and modifications may also be made to multi-plane well bore pattern 300. Although FIG. 7 depicts a plurality of upwardly ramping well bores 304a and downwardly ramping well bores 304b extending from opposite sides of the substantially horizontal well bore 308, multi-plane well bore pattern 300 may include only upwardly ramping well bores 304a or only downwardly ramping well bores 304b. Additionally, upwardly ramping well bores 304a and downwardly ramping well bores 304b may mirror one another from opposite sides of the substantially horizontal portion 308 or may be offset from one another. These modifications and others may be made to multi-plane well bore pattern 300 as appropriate to allow for the removal and production of hydrocarbons and other mineral deposits from layer 302. Gamma ray logging tools and conventional MWD technologies may be used to control the direction and orientation of the drill bit 42 so as to retain the multi-plane drainage pattern 300 within the confines of the upper boundary 310 and lower boundary 312, if appropriate, and to maintain proper spacing and orientation of ramping well bores 304 and lateral well bores 110.

Figure 8:
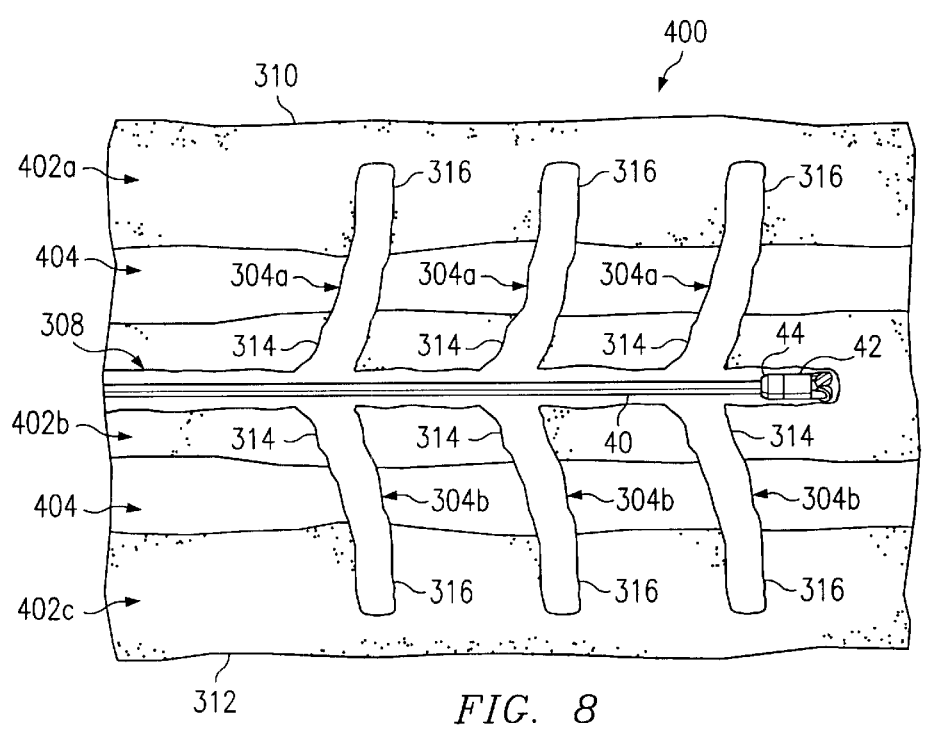
FIG. 8 is a cross-sectional diagram illustrating an example multi-plane well bore pattern for accessing multiple layers of subterranean deposits.

FIG. 8 is a cross-sectional diagram illustrating an example multi-plane drainage pattern 400 for accessing deposits in multiple layers 402 of subterranean deposits. Multi-plane drainage pattern 400 may provide access to multiple layers 402 of subterranean deposits that may be separated by impermeable or substantially impermeable material 404 such as sandstone, shale, or limestone. In this embodiment, substantially horizontal portion 308, upwardly ramping well bore 304a, and downwardly ramping well bore 304b may be formed as previously described in connection with FIG. 7.

Elongated portion 316 of upwardly ramping well bores 304a and downwardly ramping well bores 304b may be of sufficient length to allow multi-plane drainage pattern 400 to intersect multiple coal seams or multiple layers 402 of any other subterranean zone. For example, ramping well bores 304 may extend in a substantially vertical plane to provide access to an upper layer 402a and a lower layer 402c. Although only three subterranean layers 402a–c are shown in FIG. 7, multi-plane drainage pattern 400 may intersect any appropriate number of subterranean layers 402 to effectively drain the subterranean zone. For example, upwardly ramping well bores 304a and downwardly ramping well bores 304b may travel through a number of subterranean layers 402 separated by multiple layers of impermeable or substantially impermeable material 404.

As was described with regard to FIG. 7, multi-plane drainage pattern 400 may also include ramping well bores 304 that extend from opposite portions of elongated portion 116 of lateral well bores 110. Because ramping well bores 304 may extend from lateral well bores 110 or main drainage well bore 104, multi-plane drainage pattern 400 may be modified as appropriate to adequately drain multiple layers 402 of subterranean deposits. Thus, multi-plane well bore pattern 400 may merely include a main drainage well bore 104 with ramping well bores 304. As alternative embodiments, multi-plane well bore pattern 400 may include a main drainage well bore 104, lateral well bores 110, ramping well bores 304 extending from the main drainage well bore 104 and/or the lateral well bores 110, or any combination thereof. Other modifications and variations described with regard to FIG. 7 may be made to multi-plane drainage pattern 400 as appropriate.

Figure 9:
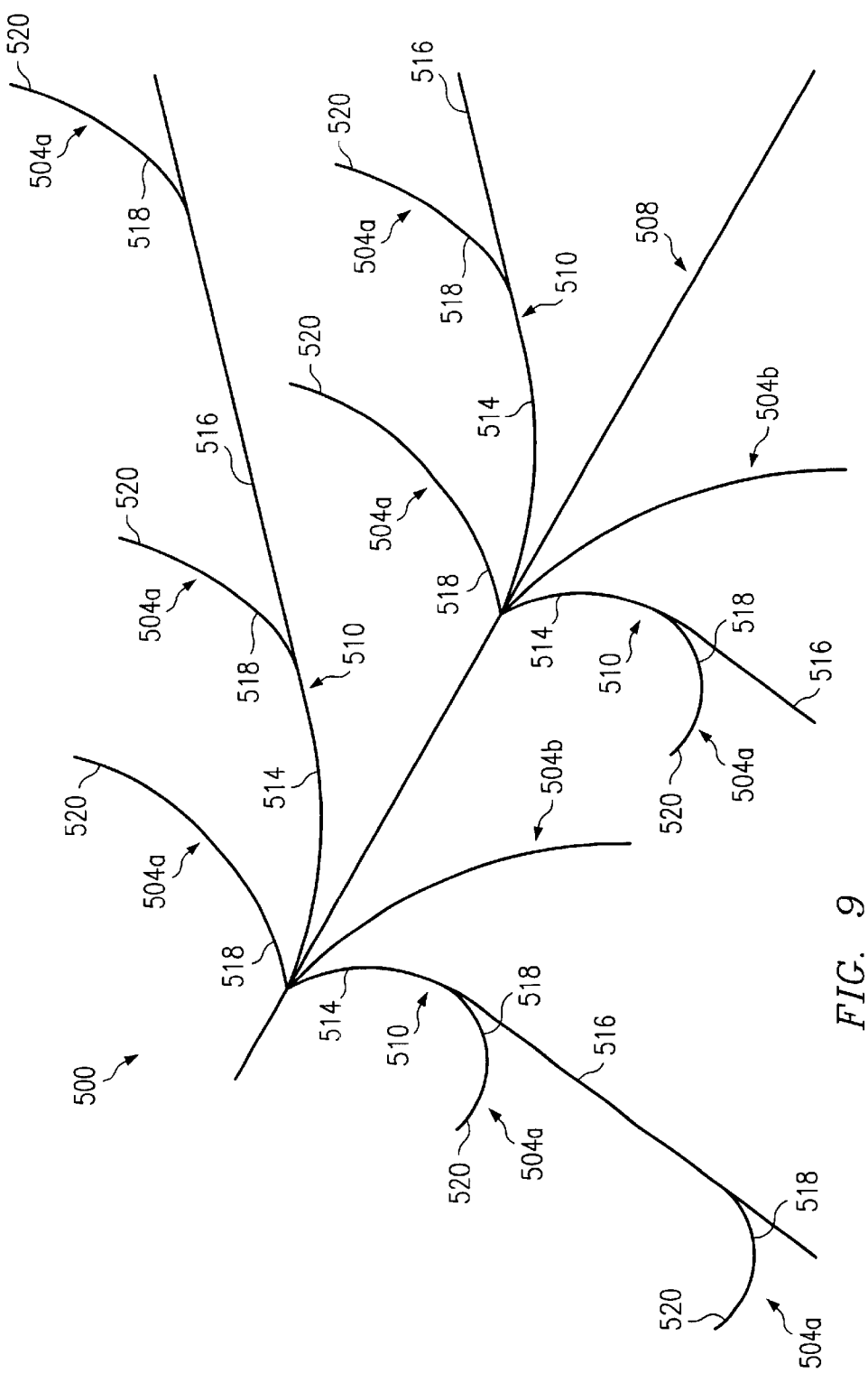
FIG. 9 is an isometric diagram illustrating an example multi-plane well bore pattern for accessing deposits in a subterranean zone.

FIG. 9 is an isometric diagram illustrating an example multi-plane drainage pattern 500 for accessing deposits in a subterranean zone. In this embodiment, the substantially horizontal portions of both the main drainage well bore 104 and the elongated portions 116 of lateral well bores 110, which are illustrated in FIG. 4, are replaced with the substantially horizontal well bore 308 described with regard to FIGS. 8 and 9. Thus, as illustrated, drainage pattern 500 includes ramping well bores 504 extending from the main drainage well bore 508 and extending from each lateral well bore 510. Alternatively, however, drainage pattern 500 may include a main drainage well bore 508 with ramping well bores 504, lateral well bores 510 extending from a main drainage well bore 508 with ramping well bores 504, or any combination thereof for producing entrained water, hydrocarbons, and other fluids from one or more layers. As was previously described, the multiplane drainage pattern 500 may provide access to a single, thick layer 302 of subterranean deposits as was described with regard to FIG. 7. Alternatively, multi-plane drainage pattern 500 may provide access to multiple layers 402 of subterranean deposits separated by impermeable or substantially impermeable material such as sandstone, shale, or limestone, as was described with regard to FIG. 8.

In particular embodiments of the present invention, lateral well bores 510 may extend from opposite sides of main drainage well bore 508 to a periphery of the area being drained. Thus, a first set of lateral well bores 510a may extend in spaced apart relation to each other from one side of main drainage well bore 508. Similarly, a second set of lateral well bores 510 may extend in spaced apart relation to each other from a second, opposite side of main drainage well bore 508. The first and second sets of lateral well bores 510 may mirror each other or may be offset from each other along the main drainage well bore 508. In particular embodiments, pairs of lateral well bores 510 may be substantially evenly spaced on each side of the main drainage well bore 508 and extend from the main drainage well bore 508 at an angle of approximately 45 degrees.

The interval spacing between ramping well bores 504 may correspond to the spacing interval between lateral well bores 510. If, for example, lateral well bores 510 extend from the main drainage well bore 508 at three hundred foot intervals, ramping well bores 504 may also extend from the same point at three hundred foot intervals. In the illustrated embodiment of the present invention, a pair of lateral well bores 510 and at least one ramping well bore 504 intersect the main drainage well bore 508 at a single location. The at least one ramping well bore 304 may comprise an upwardly ramping well bore 504a, a downwardly ramping well bore 504b, or both. In an alternate embodiment, the at least one ramping well bore 504 and pair of lateral well bores 510 may not intersect the main drainage well bore 508 at a single location. Additionally, the spacing between ramping well bores 504 may not correspond to the spacing between lateral well bores 510. For example, the interval spacing between ramping well bores 504 may approximate three hundred feet, while the interval spacing between lateral well bores 510 may approximate one hundred feet. One skilled in the art may recognize that the spacings described are merely exemplary. Any appropriate interval spacing may be used to adequately cover the area to be drained.

Further, the interval spacing between ramping well bores 504 and/or lateral well bores 510 may vary along main drainage well bore 508. For example, the interval spacing between the first ramping well bore 504 and the second ramping well bore 504 may be approximately three hundred feet and the interval spacing between the second ramping well bore 504 and the third ramping well bore 504 may be approximately two hundred feet. Similarly, the interval spacing between the first lateral 510 and the second lateral 510 may be approximately one hundred feet, and the interval spacing between the second lateral 510 and the third lateral 510 may be approximately fifty feet. The interval spacings given above are also only exemplary. One skilled in the art may recognize that the interval spacings separating ramping well bores 504 and/or lateral well bores 510 may be any appropriate interval to provide access to the one or more layers of subterranean deposits.

As was described in greater detail with regard to FIG. 4, each lateral well bore 510 may also include a radiused portion 514 and an elongated portion 516. The radiused portion 514 may connect the lateral well bore 510 to the main drainage well bore 508 at a predetermined radius of curvature. The appropriate radius of curvature may be dictated by drilling apparatus capabilities and/or by the dimensions of the area to be drained by the multi-plane well bore pattern 500. As previously described, each ramping well bore 504 may include a radiused portion 518 and an elongated portion 520.

In particular embodiments, the radius of curvature of the radiused portion 518 of the ramping well bore 504 may be substantially equal to the radius of curvature of the radiused portion 514 of the lateral well bores 510. For example, if the radius of curvature for radiused portion 514 is three hundred feet, the radius of curvature for radiused portion 518 may also be three hundred feet. Alternatively, the radius of curvature of the radius portion 518 of the ramping well bore 504 may not correspond with the radius of curvature of the radiused portion 514 of the lateral well bore 510. Thus, while the radius of curvature for radiused portion 514 may be approximately three hundred feet, the radius of curvature of radiused portion 518 may be approximately two hundred feet. Accordingly, the multi-plane drainage pattern 500 may be customized as is necessary to optimize the draining of the one or more layers of subterranean deposits. The invention is not limited to the radius of curvature dimensions given above. Rather, the radius of curvature dimensions are merely exemplary. It may be recognized by one skilled in the art that the radius of curvature of either radiused portion 514 or 518 may be any appropriate radius of curvature to provide access to the layer or layers of subterranean deposits.

A number of other variations and modifications may also be made to multiplane well bore pattern 500 as appropriate to allow for the removal and production of hydrocarbons and other mineral deposits from one or more layers of subterranean deposits. For example, although FIG. 9 depicts a plurality of upwardly ramping well bores 504a and downwardly ramping well bores 504b extending from opposite sides of the main drainage well bore 508, multi-plane well bore pattern 500 may include only upwardly ramping well bores 504a or only one downwardly ramping well bores 504b. Other suggested modifications were described with regards to FIGS. 7 and 8 and may be appropriately applied to the embodiment of FIG. 9.

FIG. 10 is a flow diagram illustrating an example method for producing gas from a subterranean zone. In this embodiment, the method begins at step 600 in which areas to be drained and drainage patterns to be used in the areas are identified. For example, drainage patterns 300, 400, or 500 may be used to provide optimized coverage for the region. It will be understood that any other suitable patterns may also or alternatively be used to degasify one or more layers of subterranean deposits.

Proceeding to step 602, the substantially vertical well 12 is drilled from the surface 14 through the subterranean zone. Next, at step 604, down hole logging equipment is used to exactly identify the location of the target layer of subterranean deposits in the substantially vertical well bore 12. At step 606, the enlarged diameter cavity 20 may be formed in the substantially vertical well bore 12 at a location within the target layer of subterranean deposits. As previously discussed, the enlarged diameter cavity 20 may be formed by under reaming and other conventional techniques. Next, at step 608, the articulated well bore 30 is drilled to intersect the enlarged diameter cavity 20. It should be understood that although the drilling of a dual well system is described in steps 602–608, any other appropriate technique for drilling into subterranean deposits may be used. After the subterranean deposits are reached, a drainage pattern may then be drilled in the deposits, as described below.

At decisional step 610, it is determined whether ramping well bores 504 should be drilled. Ramping well bores 504 may extend upwardly or downwardly from a main drainage well bore 508. In deciding whether to drill ramping well bores 504, the size and accessibility of the layer or layers of subterranean deposits may be considered. In one embodiment of the present invention, it may be desirable to drill ramping well bores 504 to access minerals, gas, and water within a single, thick layer 302 of subterranean deposits. Alternatively, ramping well bores 504 may provide access to multiple layers 402 of subterranean deposits that may be separated by impermeable or substantially impermeable material 404 such as shale, limestone, or sandstone. If at decisional step 610 it is determined that ramping well bores 504 should not be drilled, steps 612 through 614 are skipped and the method proceeds directly to step 616. If instead, however, it is determined at decisional step 610 that that ramping well bores 504 should be drilled, any secondary subterranean layers 402 of subterranean deposits, if any, may be identified at step 612. Ramping well bores 504 are drilled at step 614.

At step 616, the articulated well bore 30 maybe capped. Next, at step 618, the enlarged cavity 20 is cleaned in preparation for installation of downhole production equipment. The enlarged diameter cavity 20 may be cleaned by pumping compressed air down the substantially vertical well bore 12 or by other suitable techniques. At step 620, production equipment is installed in the substantially vertical well bore 12. The production equipment may include a sucker rod pump extending down into the cavity 20. The sucker rod pump may be used to remove water from the layer or layers of subterranean deposits. The removal of water will drop the pressure of the subterranean layers and allow gas to diffuse and be produced up the annulus of the substantially vertical well bore 12.

Proceeding to step 622, water that drains from the drainage pattern into the cavity 20 is pumped to the surface with the rod pumping unit. Water may be continuously or intermittently pumped as needed to remove it from the cavity 20. Additionally or alternatively, the drainage pattern may be used for environmental remediation purposes to treat or recover underground contaminants posing a danger to the environment. For example, the drainage pattern and cavity 20 may be used to inject a treatment solution into a contaminated coal seam or surrounding area, recover byproducts from the contaminated coal seam or surrounding area, or strip recoverable product from the coal seam. The drainage pattern may also be used for the sequestration of gaseous emissions. For example, gaseous emissions such as carbon dioxide entrained in a carrier medium may be injected into the pattern with the aid of a surface pump. At step 624, gas diffused from the subterranean zone is continuously collected at the surface 14. Upon completion of production, the method is completed.

Although the present invention has been described with several embodiments, numerous changes, substitutions, variations, alterations, transformations, and modifications may be suggested to one skilled in the art, and it is intended that the present invention encompass all such changes, substitutions, variations, alterations, transformations, and modifications as fall within the spirit and scope of the appended claims.

What is claimed is:

1. A subterranean drainage pattern for accessing an area of a subterranean zone comprising:

a main well bore extending from a surface well bore located at a first end of the area to a second end of the area, the main well bore traversing a substantially horizontal plane;

a first plurality of lateral well bores extending in spaced apart relation to each other from the main well bore to the periphery of the area on a first side portion of the main well bore, wherein the length of each of the lateral well bore progressively shortens as a distance between a respective lateral well bore and the surface well bore increases;

a second plurality of lateral well bores extending in spaced apart relation to each other from the main well bore to a periphery of the area on a second, opposite side portion of the main well bore, wherein the length of each of the lateral well bore progressively shortens as a distance between a respective lateral well bore and the surface well bore increases; and a first plurality of ramping well bores extending in spaced apart relation to each other from an upper portion of the main well bore, the first plurality of ramping well bores extending in a substantially vertical plane toward an upper boundary of the subterranean zone; and a second plurality of ramping well bores extending in spaced apart relation to each other from a lower portion of the main well bore, the second plurality of ramping well bores extending in a substantially vertical plane toward a lower boundary of the subterranean zone.

2. The subterranean drainage pattern of claim 1, wherein the subterranean zone comprises a single layer of hydrocarbons.

3. The subterranean drainage pattern of claim 2, wherein the single layer comprises a coal seam.

4. The subterranean drainage pattern of claim 1, wherein the subterranean zone comprises a plurality of layers of subterranean deposits separated by intervening layers of substantially impermeable material, the ramping well bore traversing through the plurality of layers of subterranean deposits and substantially impermeable material.

5. The subterranean drainage pattern of claim 4, wherein one or more of the plurality of layers of subterranean deposits comprise a coal seam.

6. The subterranean drainage pattern of claim 1, wherein each of the first plurality of ramping well bores mirrors one of the second plurality of ramping well bores.

7. The subterranean drainage pattern of claim 1, wherein each lateral well bore comprises:
    a radiused portion extending from the main well bore, the radiused portion comprising a radius of curvature that is substantially equal to a radius of curvature of the radiused portion each of the first plurality of ramping well bores; and
    an elongated portion extending from the radiused portion to the periphery of the area.

8. The subterranean drainage pattern of claim 1, wherein each ramping well bore comprises:
    a radiused portion extending from the main well bore; and
    an elongated portion extending from the radiused portion toward the boundary.

9. A method for drilling a subterranean drainage pattern for accessing an area of a subterranean zone comprising:
    drilling a main well bore extending from a surface well bore located at a first end of the area to a second end of the area, the main well bore traversing a substantially horizontal plane, wherein the length of each of the lateral well bore progressively shortens as a distance between a respective lateral well bore and the surface well bore increases;
    drilling a first plurality of lateral well bores extending in spaced apart relation to each other from the main well bore to the periphery of the area on a first side portion of the main well bore, wherein the length of each of the lateral well bore progressively shortens as a distance between a respective lateral well bore and the surface well bore increases;
    drilling a second plurality of lateral well bores extending in spaced apart relation to each other from the main well bore to a periphery of the area on a second, opposite side portion of the main well bore; and
    drilling a first plurality of ramping well bores extending in spaced apart relation to each other from an upper portion of the main well bore, the first plurality of ramping well bores extending in a substantially vertical plane toward an upper boundary of the subterranean zone; and
    drilling a second plurality of ramping well bores extending in spaced apart relation to each other from a lower portion of the main well bore, the second plurality of ramping well bores extending in a substantially vertical plane toward a lower boundary of the subterranean zone.

10. The method of claim 9, wherein the subterranean zone comprises a single layer of hydrocarbons.

11. The method of claim 10, wherein the single layer comprises a coal seam.

12. The method of claim 9, wherein the subterranean zone comprises a plurality of layers of subterranean deposits separated by intervening layers of substantially impermeable material, the ramping well bore traversing through the plurality of layers of subterranean deposits and substantially impermeable material.

13. The method of claim 12, wherein at least one of the plurality of layers of subterranean deposits comprises a coal seam.

14. The method of claim 9, wherein each of the first plurality of ramping well bores mirrors one of the second plurality of ramping well bores.

15. The method of claim 9, wherein drilling each lateral well bore comprises:
    drilling a radiused portion extending from the main well bore, the radiused portion comprising a radius of curvature that is substantially equal to a radius of curvature of the radiused portion each of the first plurality of ramping well bores; and
    drilling an elongated portion extending from the radiused portion to the periphery of the area.

16. The method of claim 9, wherein drilling each ramping well bore comprises:
    drilling a radiused portion coupling extending from the main well bore; and
    drilling an elongated portion extending from the radiused portion toward the boundary.

17. A subterranean drainage pattern for accessing an area of a subterranean zone comprising:
    a main well bore extending from a surface well bore located at a first end of the area to a second end of the area, the main well bore traversing a substantially horizontal plane;
    a first plurality of lateral well bores extending in spaced apart relation to each other from the main well bore to the periphery of the area on a first side portion of the main well bore, wherein the length of each of the lateral well bore progressively shortens as a distance between a respective lateral well bore and the surface well bore increases;
    a second plurality of lateral well bores extending in spaced apart relation to each other from the main well bore to a periphery of the area on a second, opposite side portion of the main well bore, wherein the length of each of the lateral well bore progressively shortens as a distance between a respective lateral well bore and the surface well bore increases; and
    a first plurality of ramping well bores extending in spaced apart relation to each other from an upper portion of at least one of the first plurality of lateral well bores the first plurality of ramping well bores extending in a substantially vertical plane toward an upper boundary of the subterranean zone; and
    a second plurality of ramping well bores extending in spaced apart relation to each other from a lower portion of the at least one of the first plurality of lateral well bores, the second plurality of ramping well bores extending in a substantially vertical plane toward a lower boundary of the subterranean zone.

18. The subterranean drainage pattern of claim 17, wherein the subterranean zone comprises a single layer of hydrocarbons.

19. The subterranean drainage pattern of claim 18, wherein the single layer comprises a coal seam.

20. The subterranean drainage pattern of claim 17, wherein the subterranean zone comprises a plurality of layers of subterranean deposits separated by intervening layers of substantially impermeable material, the ramping well bore traversing through the plurality of layers of subterranean deposits and substantially impermeable material.

21. The subterranean drainage pattern of claim 20, wherein at least one of the plurality of layers of subterranean deposits comprises a coal seam.

22. The subterranean drainage pattern of claim 17, wherein each of the first plurality of ramping well bores mirrors one of the second plurality of ramping well bores.

23. The subterranean drainage pattern of claim 17, wherein each lateral well bore comprises:

a radiused portion extending from the main well bore, the radiused portion comprising a radius of curvature that is substantially equal to a radius of curvature of the radiused portion each of the first plurality of ramping well bores; and an elongated portion extending from the radiused portion to the periphery of the area.

24. The subterranean drainage pattern of claim 17, wherein each ramping well bore comprises:

a radiused portion extending from the main well bore; and an elongated portion extending from the radiused portion toward the boundary.

25. A method for drilling a subterranean drainage pattern for accessing an area of a subterranean zone comprising:

drilling a main well bore extending from a surface well bore located at a first end of the area to a second end of the area, the main well bore traversing a substantially horizontal plane;

drilling a first plurality of lateral well bores extending in spaced apart relation to each other from the main well bore to the periphery of the area on a first side portion of the main well bore, wherein the length of each of the lateral well bore progressively shortens as a distance between a respective lateral well bore and the surface well bore increases;

drilling a second plurality of lateral well bores extending in spaced apart relation to each other from the main well bore to a periphery of the area on a second, opposite side portion of the main well bore, wherein the length of each of the lateral well bore progressively shortens as a distance between a respective lateral well bore and the surface well bore increases; and drilling a first plurality of ramping well bores extending in spaced apart relation to each other from an upper portion of at least one of the first plurality of lateral well bores, the first plurality of ramping well bores extending toward an upper boundary of the subterranean zone; and drilling a second plurality of ramping well bores extending in spaced apart relation to each other from a lower portion of the at least one of the first plurality of lateral well bores, the second plurality of ramping well bores extending toward a lower boundary of the subterranean zone.

26. The method of claim 25, wherein the subterranean zone comprises a single layer of hydrocarbons.

27. The method of claim 26, wherein the single layer comprises a coal seam.

28. The method of claim 25, wherein the subterranean zone comprises a plurality of layers of subterranean deposits separated by intervening layers of substantially impermeable material, the ramping well bore traversing through the plurality of layers of subterranean deposits and substantially impermeable material.

29. The method of claim 28, wherein at least one of the plurality of layers of subterranean deposits comprises a coal seam.

30. The method of claim 25, wherein each of the first plurality of ramping well bores mirrors one of the second plurality of ramping well bores.

31. The method of claim 25, wherein drilling each lateral well bore comprises:

drilling a radiused portion extending from the main well bore, the radiused portion comprising a radius of curvature that is substantially equal to a radius of curvature of the radiused portion each of the first plurality of ramping well bores; and drilling an elongated portion extending from the radiused portion to the periphery of the area.

32. The method of claim 25, where in drilling each ramping well bore comprises:

drilling a radiused portion extending from the main well bore; and drilling an elongated portion extending from the radiused portion toward the boundary.

* * * * *